(12) United States Patent
Bloom et al.

(10) Patent No.: US 8,266,853 B2
(45) Date of Patent: Sep. 18, 2012

(54) CORBEL REPAIRS OF COKE OVENS

(75) Inventors: Robert A. Bloom, Orchard Park, NY (US); Paul A. Saffrin, Orchard Park, NY (US)

(73) Assignee: Vanocur Refractories LLC, Tonawanda, NY (US)

( * ) Notice: Subject to any disclaimer, the term of this patent is extended or adjusted under 35 U.S.C. 154(b) by 236 days.

(21) Appl. No.: 12/464,647

(22) Filed: May 12, 2009

(65) Prior Publication Data
US 2010/0287871 A1 Nov. 18, 2010

(51) Int. Cl.
*E04H 12/28* (2006.01)
*F23M 5/02* (2006.01)

(52) U.S. Cl. ............ 52/218; 52/505; 52/607; 52/612; 52/747.12; 110/338

(58) Field of Classification Search .......... 52/218, 52/506, 505, 606, 607, 612, 506.02, 604, 52/561, 566, 570, 302.4, 749.13, 747.12; 110/336, 338
See application file for complete search history.

(56) References Cited

U.S. PATENT DOCUMENTS

| | | | | |
|---|---|---|---|---|
| 687,106 A | * | 11/1901 | Anderson | 404/3 |
| 756,300 A | * | 4/1904 | Underwood | 52/284 |
| 786,884 A | * | 4/1905 | Faulkner | 52/289 |
| 861,348 A | * | 7/1907 | Baltz | 52/589.1 |
| 1,277,829 A | * | 9/1918 | Baum | 52/607 |
| 1,381,625 A | * | 6/1921 | Finch | 165/9.1 |
| 1,487,247 A | * | 3/1924 | Lane | 52/591.2 |
| 1,496,754 A | * | 6/1924 | Eaves | 52/503 |
| 1,505,257 A | * | 8/1924 | Griffiths | 110/336 |
| 1,522,880 A | * | 1/1925 | Walter | 110/305 |
| 1,522,881 A | * | 1/1925 | Griffiths | 165/9.1 |
| 1,785,499 A | * | 12/1930 | Sayers | 52/505 |

(Continued)

FOREIGN PATENT DOCUMENTS

JP 2002195506 A * 7/2002

(Continued)

OTHER PUBLICATIONS

USPTO Office Action—U.S. Appl. No. 11/653,695 dated May 11, 2009, 16 pages.

*Primary Examiner* — Robert Canfield
*Assistant Examiner* — Brent W Herring
(74) *Attorney, Agent, or Firm* — Brian B. Shaw, Esq.; Michael J. Didas, Esq.; Harter Secrest & Emery LLP

(57) ABSTRACT

An improved corbel includes a first tier having first blocks and a second tier having second blocks. Each of the first blocks includes a first aperture extending through the block from a first surface to a back surface and a second aperture formed through a top surface of the block, extending into the first aperture. The first blocks are arranged on a substantially planar surface to align the respective first apertures to define a first passageway. Each of the second blocks includes a third aperture extending through the second block from a top surface to a bottom surface. The second blocks are disposed above the first tier to align the third aperture of each of the second blocks with the second aperture of the first blocks to form a second passageway.

19 Claims, 11 Drawing Sheets

U.S. PATENT DOCUMENTS

| | | | |
|---|---|---|---|
| 2,476,305 A * | 7/1949 | Kimmel | 52/747.13 |
| 2,720,779 A * | 10/1955 | Earnest | 52/444 |
| 2,845,385 A * | 7/1958 | Van Ackeren | 202/141 |
| 2,851,760 A * | 9/1958 | Taylor | 264/30 |
| 3,766,699 A * | 10/1973 | Dinkel | 52/591.4 |
| 4,059,885 A | 11/1977 | Oldergott | |
| 4,069,633 A | 1/1978 | Cooper et al. | |
| 4,364,798 A | 12/1982 | Costa | |
| 4,452,749 A | 6/1984 | Klovek et al. | |
| 4,478,208 A * | 10/1984 | Pitha | 126/500 |
| 4,565,605 A | 1/1986 | Kruse | |
| 4,823,530 A * | 4/1989 | Haring | 52/317 |
| 5,078,595 A * | 1/1992 | Roenigk et al. | 432/164 |
| 5,227,106 A | 7/1993 | Kolvek | |
| 5,423,152 A | 6/1995 | Kolvek | |
| 5,950,397 A * | 9/1999 | Ginn et al. | 52/742.14 |
| 6,066,236 A | 5/2000 | Gilroy | |
| 6,134,921 A * | 10/2000 | Hull et al. | 65/346 |
| 6,161,357 A * | 12/2000 | Altemus | 52/592.6 |
| 6,318,041 B1 * | 11/2001 | Stanley | 52/505 |
| 6,539,602 B1 | 4/2003 | Ozawa et al. | |
| 7,191,571 B2 * | 3/2007 | Schools et al. | 52/607 |
| 7,802,410 B2 * | 9/2010 | Breaz | 52/503 |
| 2009/0126306 A1 * | 5/2009 | Jonville et al. | 52/506.02 |

FOREIGN PATENT DOCUMENTS

WO    WO 2010015964 A2 *    2/2010

* cited by examiner

Fig. 4
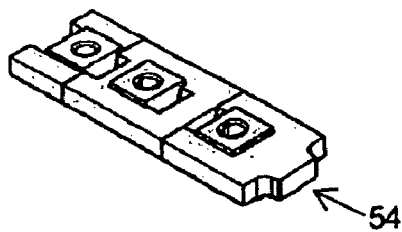
TIER 10
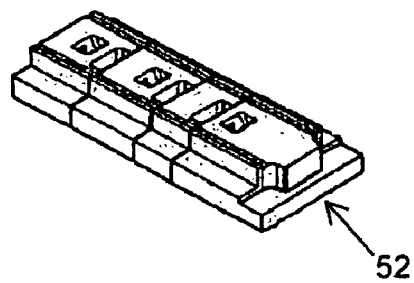
TIER 8-9
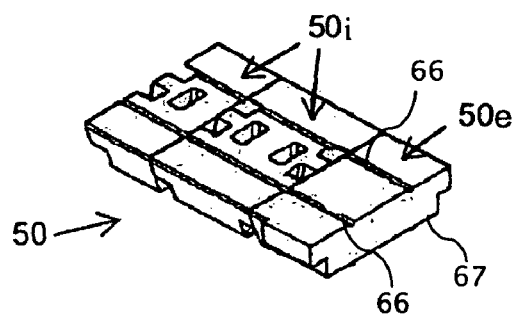
TIER 6-7
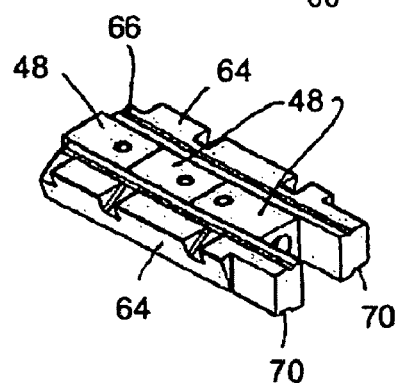
TIER 4-5
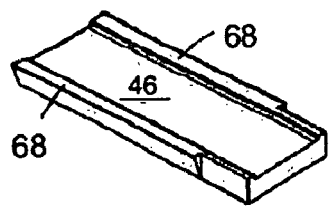
TIER 3

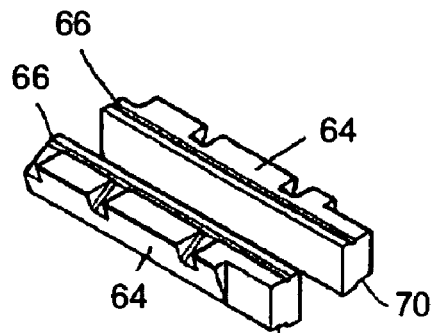
Fig. 5
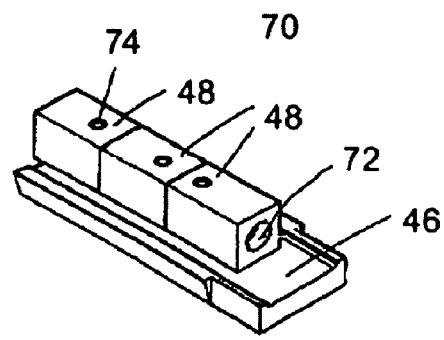
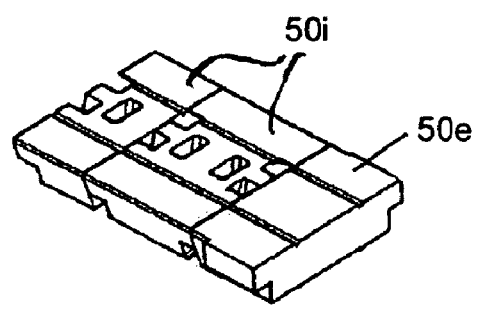
Fig. 6
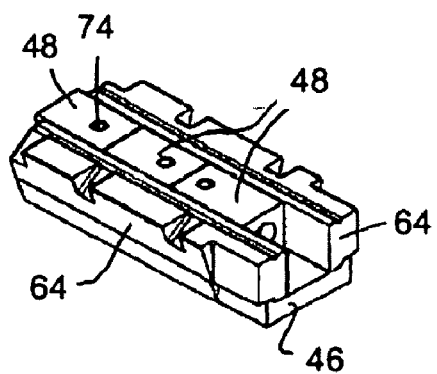

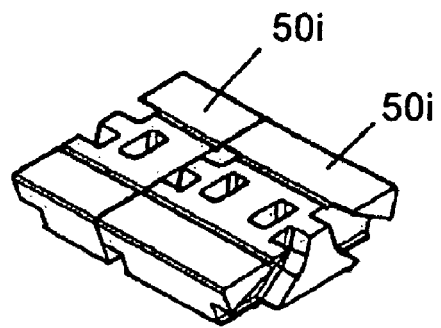
Fig. 7
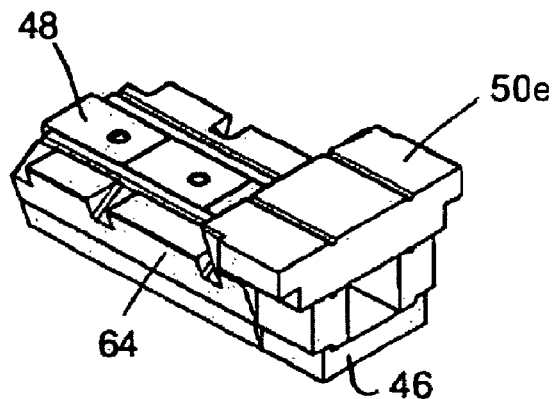
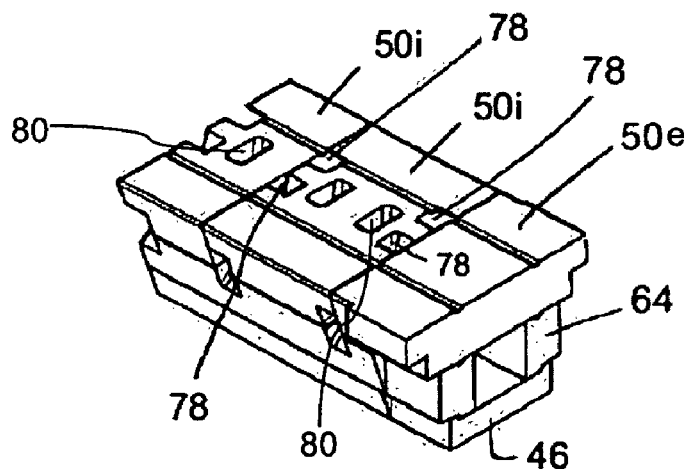
Fig. 8

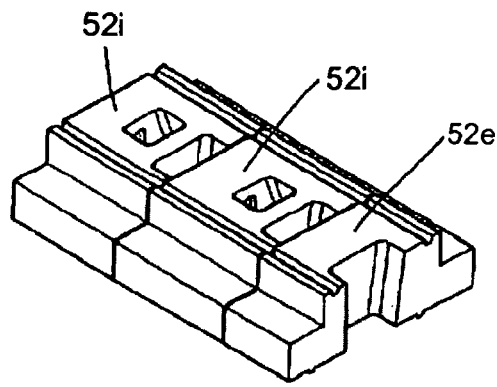
Fig. 8a
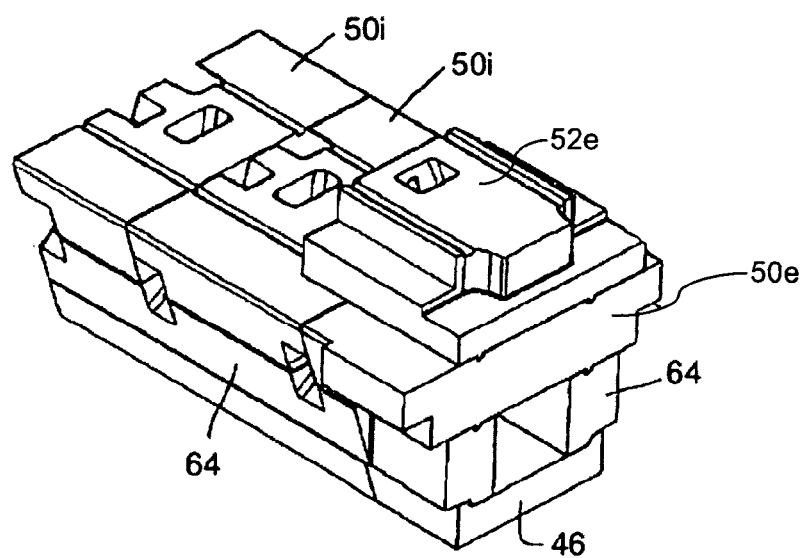

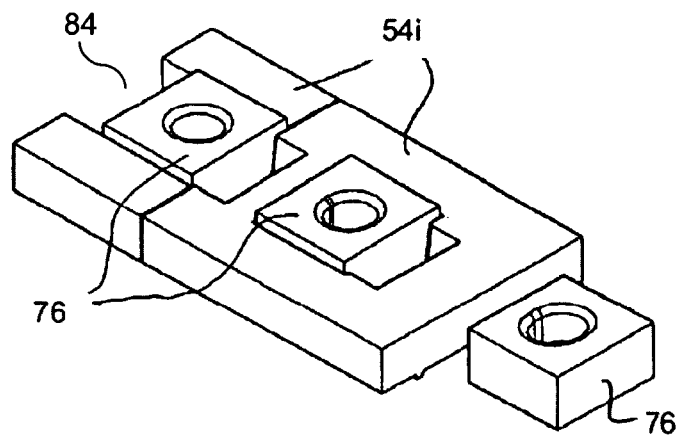
Fig. 10
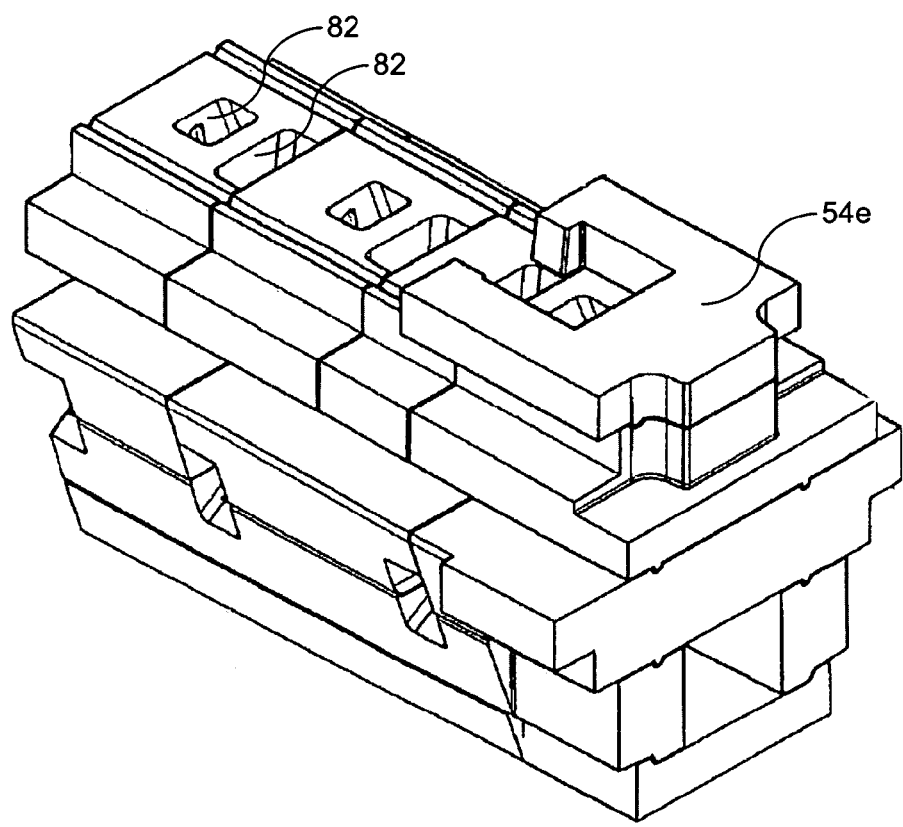

CORBEL REPAIRS OF COKE OVENS

CROSS-REFERENCE TO RELATED APPLICATIONS

Technical Field

The present invention relates to a repair of the corbel section of a coke oven, and more particularly to a new, faster and more efficient way to reconstruct this section, wherein large size cast monolithic modules having high dimensional stability, negligible expansion on heating, good compressive strength and good thermal shock resistance in the range of −20 degrees to 1565 degrees Celsius are employed.

BACKGROUND OF THE INVENTION

Coke is typically produced by heating coal in a coke oven battery. This battery may have anywhere from 40 to over 100 side-by-side coking chambers or ovens separated from each other by heating walls. Gas is burned within the walls to heat the coal. The floor bricks of each oven rest upon corbels. Below the corbels is an area called the regenerator. The regenerator is filled with bricks that have a relatively large amount of surface area per volume, generally due to slots formed in the bricks. In the regenerator, exhaust waste heat is used to pre-heat incoming air cooling the exhaust waste heat prior to discharge. The slotted bricks are called checkerbricks, and they facilitate the heat transfer from the exhaust waste heat to the combustion materials.

The regenerator supports the corbels. In turn, the corbels support the coke oven floor bricks and the heating walls. The corbels have passageways through which the gas, incoming air and exhaust waste heat are routed from the regenerator to the heating walls and vice-versa. The heating walls, floor bricks, and corbels have traditionally been made of silica brick.

Most coke oven batteries in the United States and, indeed, many throughout the world, are over fifty years old, and are in need of periodic repairs. The silica bricks that make up the oven walls, floors, and corbels begin to degrade as they age due to the cycles of heating and cooling to which they are subjected. Minor repairs are done to keep the ovens operational, and may include repairing the bricks in the ends of the walls, or by replacing the end portions of the walls (end wall repairs). When the degradation of the heating wall becomes severe, the entire wall between two ovens may need to be replaced. In severe cases, the corbel portion of the oven below the oven floor can suffer the same type of degradation as the heating walls of the oven. Cracks may become so large that gas may come out through fractures or the joints between bricks and burn in the regenerator. This results in decreased efficiency and increased operating costs. When this happens, the corbel may need to be repaired or partially or completely replaced.

When the corbel needs to be repaired or replaced, the coking chambers in the immediate vicinity are shut down, and the wall above the corbel and the portion of the corbel which needs replacement are removed. In the past, bricklayers then replace the corbel, or portion thereof, using silica bricks. The process involves hundreds or thousands of silica bricks in a multitude of different shapes, sizes, and arrangements. As there are numerous orifices which are needed to allow gas, air, and exhaust waste heat to flow through the corbel, the silica bricks need to be fit together in a manner similar to a 3-dimensional jigsaw puzzle in order to get the proper shape and configuration of the corbel. This process is labor-intensive and time-consuming. Additionally, each abutment of adjacent bricks creates a joint, and each joint becomes a potential leak point as the wall or corbel begins to deteriorate with use. Because of the large number of bricks used, there are hundreds, and sometimes thousands, of potential failure points in corbels constructed using the conventional techniques and silica bricks.

U.S. Pat. No. 6,539,602 discloses a method of repairing a coke oven wall by using pre-assembled portions of brick. However, although this method could be applicable to repairing corbels, it would have many more joints than the method of this invention and, therefore, would be prone to the same leakage problems over time to which traditional repairs are prone.

Large thermally stable blocks or modules of a non-expanding material with high dimensional stability, good compressive loading and good thermal shock resistance in a range of 0 degrees to 2850 degrees Fahrenheit are shown in U.S. Pat. No. 5,227,106 and No. 5,423,152. These have been developed for endwall repairs, and have recently been used for complete heating wall replacements. Now, it appears that it is also possible to use similar blocks for corbel repairs or replacement. While each set of blocks must be custom-made for each installation, it is still a cheaper and longer-lasting repair than those completed with traditional bricks. In addition, this is a much faster method of effecting the repairs than the traditional method, resulting in less down-time.

OBJECTS AND SUMMARY OF THE INVENTION

It is an object of this invention to reconstruct the corbel of a coke oven, either in full or in part, with large-size cast monolithic thermally stable non-expanding blocks or modules. The replacement corbel will be more cost-effective to construct, and will not degrade as rapidly as the silica bricks which it is replacing. Thus, the large modules or blocks will save significant amounts of money over their lifetime, both in the reduced installation costs and in a longer expected life span. Fewer, if any, repairs will be needed, in contrast to corbels made of silica bricks. Additionally, the efficiency of the oven will be increased, as gas leakage will be minimized or eliminated.

More particularly, it is an object of this invention to use the large size cast modules in a corbel replacement, which modules are made of material which will have high dimensional stability, negligible expansion on heating, good compressive strength and good thermal shock resistance in the range of 0 degrees to 2850 degrees Fahrenheit. The large-sized modules allow the repairs to be completed in about half the time of the repairs with silica bricks, and the repairs can be done by plant staff rather than bricklayers, thus providing additional cost savings. In addition, due to the dimensional stability of the blocks over a wide range of temperatures, the corbel should last significantly longer and need fewer repairs over its life than corbels of silica bricks.

The above objects and other objects and advantages of this invention will become apparent after a consideration of the following detailed description taken in conjunction with the accompanying figures.

BRIEF DESCRIPTION OF THE FIGURES

FIG. 4 is an exploded perspective view of tiers 3-10 of a second embodiment of a replacement corbel wherein large size cast modules are used to replace tiers 3-10 of silica bricks.

FIG. 5 is a perspective view of the gun blocks of tier 4-5 shown in FIG. 4 which are emplaced on the foundation block.

FIG. 6 is a perspective view of tiers 3-5 assembled and replacement tier 6-7, lateral blocks of tier 4-5, which flank the gun blocks, emplaced.

FIG. 7 is a perspective view of tiers 3-7 partially assembled, with the end block of replacement tier 6-7 emplaced.

FIG. 8 is a perspective view of tiers 3-7 fully assembled.

FIG. 8a is a perspective view of tiers 3-9, with replacement tier 8-9 being partially assembled on the assembled tiers 3-7.

FIG. 10 is a perspective view of tiers 3-10, with replacement tier 10 being partially assembled on the assembled tiers 3-9.

DETAILED DESCRIPTION

Figure 1:
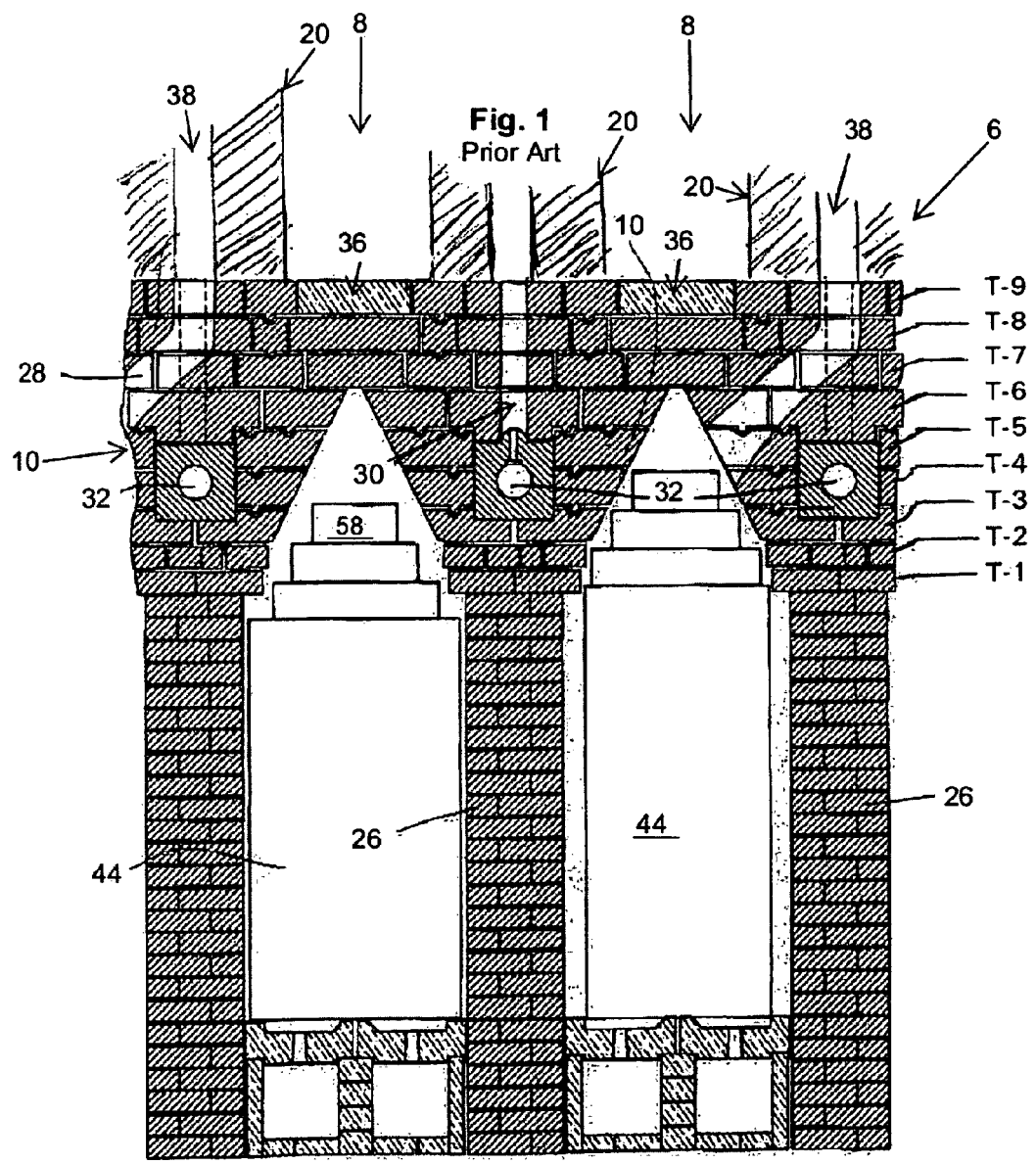
FIG. 1 is an end view of a portion of a prior art coke oven battery showing portions of ovens, floors, a 9-tier corbel, and regenerator region constructed with silica bricks.

A portion of a typical prior art coke oven battery, indicated generally at 6, is illustrated in FIG. 1. The coke oven battery consists of many ovens, each being indicated generally at 8. Each oven may be 3 to 6 meters high and may be 15 meters in length. Coal is placed in the ovens 8, and is heated to produce coke and by-product gases. Coal within the ovens is supported on a floor 36. The coal in the ovens is heated from heating walls 20, which define the sides of the ovens. In this embodiment, the heating walls are each provided with a plurality of side by side pairs of vertically extending flues 38, one flue of each pair receiving air and gas which are burned within the heating wall, the burning gas moving upwardly through the flue, although other flue arrangements are possible. Exhaust waste heat flows downwardly through the other flue of each pair. The flow through the flues is reversed periodically.

The foundation for the typical coke oven battery includes spaced apart piers 26, and a regenerator region, indicated generally at 58, disposed between adjacent piers. Each regenerator region includes checker bricks 44. Corbels, indicated generally at 10, are supported on the piers. In the prior art corbel construction shown in FIG. 1, a nine course, or tier, corbel is illustrated. The corbel is formed of a large number of silica bricks, the various tiers being indicated as T-1, T-2, . . . T-9. The piers also conventionally are made of silica brick.

The corbels 10 serve not only to support the heating walls and the coal within the ovens, but also to channel air, gas, and exhaust waste heat to the proper locations. To this end, each corbel 10 has orifices which define a network of passageways, some of which are shown in FIG. 1. In the gun-type coke oven battery shown in FIG. 1, each corbel has one main horizontal gas line 32 running lengthwise through the corbel for substantially the full length of the associated heating wall supported by the corbel. In addition, it has several vertical branches or apertures 30 extending from the main horizontal gas line 32, one vertical branch 30 for each flue 38. Shut-off means (not illustrated) are provided for selectively shutting off the gas flow through every other vertical branch 30. During operation, the shut-off means will be periodically operated in such a manner that the flow through the pairs of flues are reversed, not only to insure even heating and maintain safe temperatures throughout the ovens, but also to insure preheating of incoming air and gas by passing exhaust waste heat through various portions of the regenerator. The corbels also are provided with additional passageways 28. Air that is preheated in the regenerator flows through these passageways 28, which air will be mixed with the gas flowing through vertical gas lines 30. These additional passageways 28 also are provided to receive exhaust waste heat and direct such heat to the regenerator where incoming air and gases are preheated.

Each corbel of the prior art is formed by fitting hundreds or thousands of silica bricks, of many differing shapes, together in a prescribed fashion to create the corbel with the appropriate passageways. Such conventional construction is well known to those skilled in the art. As previously noted, it is sometimes necessary to repair corbels. Traditionally this has been done by bricklayers who, after removing the old brickwork, repair it with the same shaped silica bricks as those removed. As the bricks are of a relatively small size, there are many joints through which air and gases can pass. This problem is compounded by the fact that during heat-up of the repaired corbel the silica bricks will expand. This factor must be taken into account when initially casting the replacement silica bricks, making it virtually impossible to construct a leak free repair. Repairing a corbel using the conventional method is a very labor intensive and time-consuming process.

In accordance with this invention, a corbel repair is done by using large size cast monolithic modules having high dimensional stability and negligible expansion on heating. The modules are cast using known methods, and once cast, will be used in an environment ranging in temperature from 0 degrees to 2850 degrees Fahrenheit. The modules preferably have good compressive strength and good thermal shock resistance, and may be made using methods and materials similar to those described in U.S. Pat. No. 5,227,106 and No. 5,423,152, which are hereby incorporated by reference.

The process of this invention using large size cast monolithic modules has many advantages. Initially, the repair process can be done by plant personnel rather than brick layers, thus saving on labor costs. In addition, the process of this invention takes less time, as there are fewer large size cast monolithic modules to be installed than the silica bricks which they replace. For example, each large size cast monolithic module typically replaces a number of silica bricks, for example 15 or more, thus requiring much less time for the installation of the replacement. And because there are significantly fewer modules compared to the number of silica bricks that would have been used in prior art repairs, not only are there significantly lower repair costs, thus reducing down time, but there is a significant reduction in leakage because there are so many fewer joints between the modules. Finally, because of the greater resistance to thermal expansion, the modules used in the corbel repair of this invention should last much longer without deterioration, and the corbel can be constructed to hot dimensions, thus eliminating any leaks in the initial repair.

Figure 2:
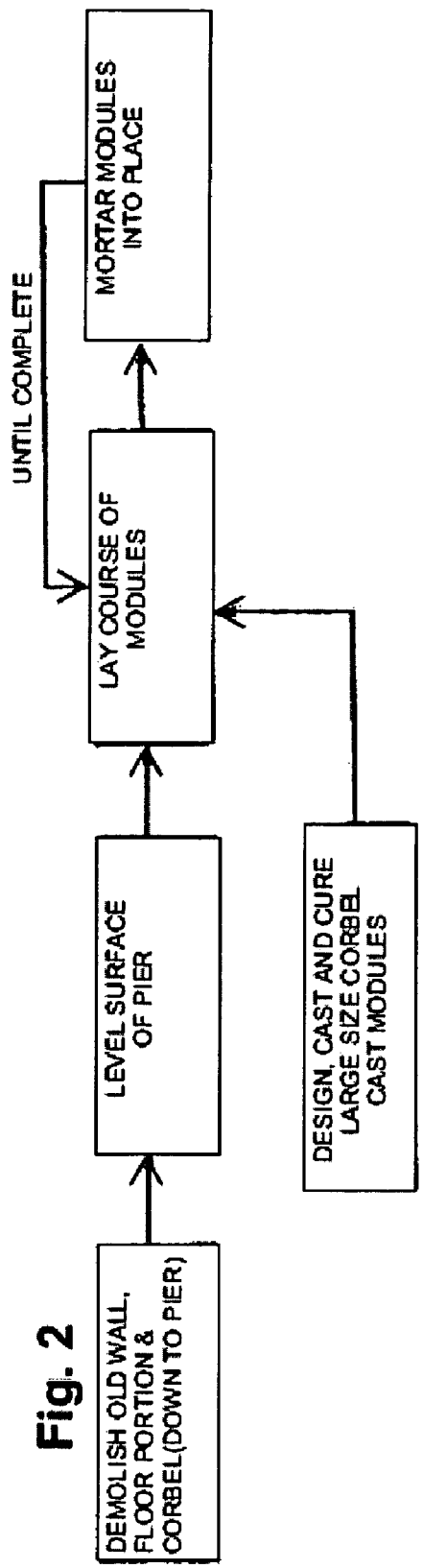
FIG. 2 is a flowchart of the steps used in the process of constructing a corbel according to this invention.

FIG. 2 is a flow chart of the steps used in replacing a corbel according to the new process described by this invention. As can be seen, initially the old wall is demolished, as well as the oven floor and at least a portion of the corbel. Typically, the bottom two courses or tiers of a corbel do not have to be demolished, as there are no gas and air passageways in the bottom two tiers, and these tiers generally are not damaged during operation of the battery. After the previous construction has been demolished, the top of the structure which is to receive the large size cast monolithic modules of this invention is leveled, using mortar as required.

Corbel modules are cast based on either the original blueprints or alternatively overall measurements of the corbel being demolished. The casting typically takes place before the corbels to be repaired are demolished, as otherwise there would be a delay in time while the modules of this invention are being cast and cured. When the new modules are cast, the castings may be designed to replace a single course or tier of silica bricks, or more than one course of silica bricks. In addition, the modules are designed to eliminate many of the potential leak paths. A typical module replaces many silica bricks, for example two or more courses, and the numerous bricks necessary to construct three or more flues in each course. However, as can be seen from FIG. 4, other configurations of large size cast modules may be cast. In any event, all of the large size cast modules used in a corbel repair are designed to replace a number of silica bricks.

After the modules have been cast and cured, they are marked with appropriate indicia so that they can be assembled in order. To build the new corbel, a first layer of modules are placed in the desired position and are mortared in place. Subsequent layers of modules are added and mortared into place until construction of the corbel is complete.

Figure 3:
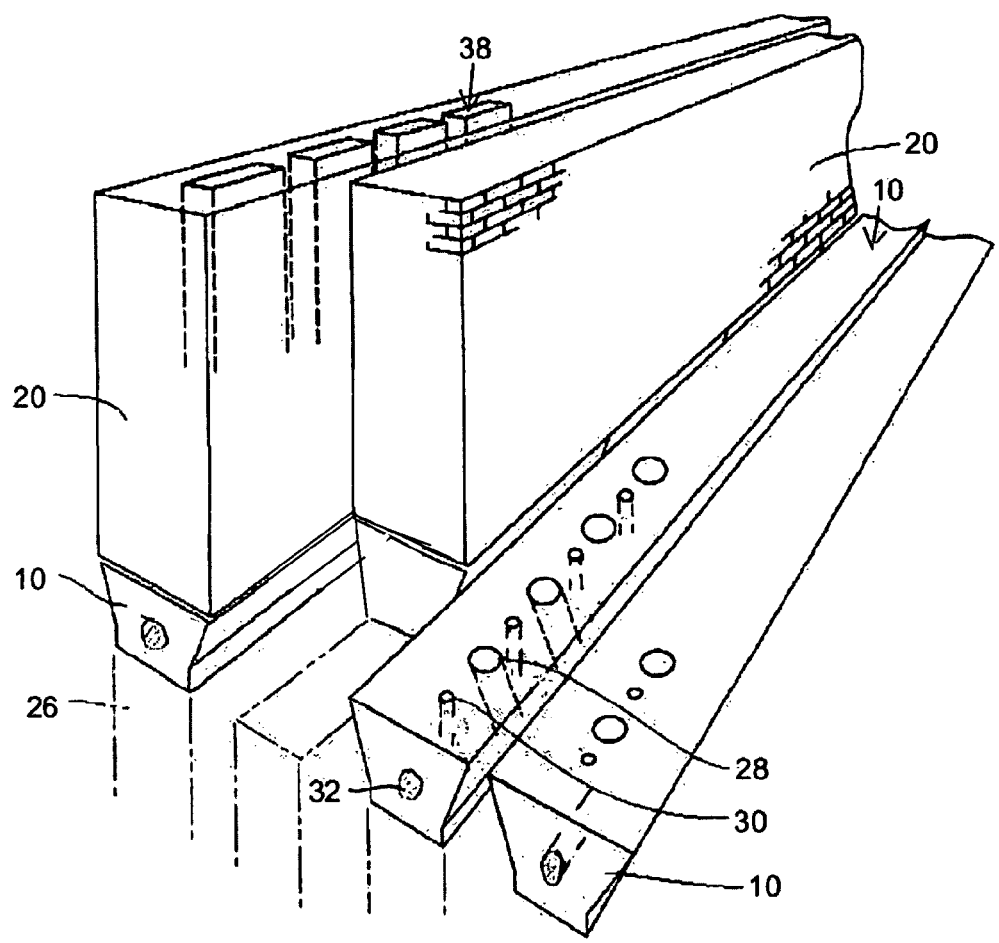
FIG. 3 is a perspective view of a portion of a coke oven battery, including piers and corbel, and walls, with a portion of a wall and a corbel removed.

FIG. 3 shows a portion of a coke oven battery. The corbels, shown generally at 10, are located below the floor of the oven, not shown, and rest on pillars 26, also shown in FIG. 1. Because silica bricks expand and contract with heating and cooling, the corbels do degrade with use. When this happens, both the gas lines 30, 32 and the air passageways 28 within the corbels can develop leaks, generally at the joints between bricks, with gas sometimes flaming below the ovens, and air leaking out of the air passageways. This leads to a decrease in the efficiency of the coke oven.

When the corbel needs to be repaired or replaced, it is generally done in conjunction with a wall repair or replacement. Prior to beginning demolition of the wall and corbel, the replacement modules are designed, cast, cured, and marked with appropriate indicia so that they can be assembled in order. Once the modules have been made, the wall 20 above the corbel is torn out, and then the portion of the floor above the corbel to be repaired is removed. Finally, the corbel is torn out down to the piers 26 which support it. As noted above, a portion of the corbel 10 may alternatively be left on the piers 26. Because the corbel is below floor level, it may be impractical to use heavy machinery, and thus the corbel is preferably dismantled manually. After the tearout, the debris is removed. Industrial-strength vacuum equipment can be used to assist in the cleaning process. Then the top portion of the pier or pillar is leveled as necessary and sealed with mortar or other appropriate material in preparation for the replacement of the corbel. This invention can also be used in construction of a corbel for a new coke oven, in which case, the first step, demolishing the old wall, floor and corbel would be omitted. The pier would be checked to insure that it is level, but actual leveling might not be necessary.

The large-size cast monolithic refractory repair modules or blocks 22 used to build the corbel according to this invention have high dimensional stability, good compressive loading and good thermal shock resistance in a range of zero degrees to 2850 degrees Fahrenheit. The modules are custom made for each installation and, using a diagram that references the indicia marked on the modules, it is easy for plant personnel to determine the location of each specific module within the corbel structure. Once it is determined which blocks go in the first layer, the blocks are emplaced and mortared into place. These steps are repeated with subsequent layers of blocks, until the corbel is complete.

FIG. 4 shows in detail the individual layers of blocks that go into making the corbel and FIGS. 5-10 show the steps in which the layers are placed to form the corbel. The first course or tier of blocks to be laid, the foundation block 46, rests on the substantially planar top of the pier 26 (or a lower tier of the corbel if the corbel has not been entirely removed). The foundation block 46 in this embodiment is preferably the thickness of one course of silica bricks, although it can be thicker. The foundation block preferably is the width of the corbel and can have any length that can be practicably cast. The foundation block is likely a fraction of the overall length of the corbel. As will be understood, the foundation block replaces numerous original bricks. In the embodiment shown, the foundation block has two raised lips 68 one at each of the outer edges. The lips 68 run lengthwise along the length of the block.

The tier of blocks above the foundation blocks includes two types of blocks, namely, gunblocks 48 and lateral blocks 64. The lateral blocks 64 are placed on either side of the gunblocks 48. The gunblocks have horizontal apertures 72 which run lengthwise through the blocks to define the horizontal gas lines. Vertical apertures 74 extend upwardly from the horizontal apertures 72 to define the initial portion of the vertical gas lines flues. The lateral blocks preferably are the same height as the gun blocks, but may be longer, shorter or the same length. As illustrated, in one embodiment a single lateral block is longer then three gun blocks. Each lateral block 64 preferably includes a lengthwise indentation 70 formed of an outside, bottom surface. In addition, a number of angled notches 71 are formed at top, outside surfaces of the lateral blocks. In another embodiment, the notches 71 could be bound on all sides, thus creating a diagonal passageway opening at the top and side of the lateral block. A groove 66 also is formed along the length of the lateral block. In the embodiment shown, this tier of blocks, as well as the two tiers above it, shown generally at 50 and 52 in FIG. 4, are the thickness of two layers of silica bricks, although they can be thicker or thinner. As can be seen, blocks in both the latter two tiers have cavities of various shapes which define portions of gas lines and flues.

The gunblocks 48 are placed on the foundation block 46 between the raised lips 68. FIG. 6 shows the lateral blocks 64 emplaced in their correct position next to the gunblocks 48. The lateral blocks 64 are placed alongside the gunblocks 48, with the lengthwise indentation 70 mating with the raised lips. As illustrated, the horizontal apertures 72 align to form the substantially horizontal gas line. As illustrated in FIG. 13 the gunlocks could also include a lip 34 on one end of the block, circumscribing the aperture 72. Although not shown, the opposing end of the gunblock includes an indentation circumscribing the aperture 72. In this embodiment, when the gunblocks are placed on the fountain block, the lip 34 of one block is received in the indentation of the adjacent block, to align adjacent blocks, and create a contiguous gas line, less prone to leaks.

The tier placed directly above the gunblocks and lateral block includes end modules 50*e* and intermediate modules 50*c*. FIG. 7 shows one of the end modules 50*e* emplaced. The intermediate blocks 50*i* are designed to rest on one or both of the lateral blocks 64 and the gunblocks 48. The intermediate blocks 50*i* include a number of apertures formed therethrough. In the illustrated embodiment, substantially vertical apertures 80 are disposed through the intermediate block 50i, extending from the top surface to the bottom surface. Diagonal apertures 78, best shown in FIG. 7, depend angularly through the intermediate blocks 50i from the top surface to one or both of the side and bottom surfaces. The vertical apertures 80 and/or the diagonal apertures 78 may also be formed in the end blocks 50e. Raised ridges 71 are provided on the bottom surface of the intermediate and end blocks 50i, 50e. As shown in FIG. 8, the blocks 50e and 50i are fitted together on the lower tier. When so placed, the vertical apertures 80 substantially align with the vertical aperture 74 of the gunblocks to form a portion of the flue, and the diagonal apertures 78 align with the angled notches 71 of the lateral blocks to form air passageways when the intermediate and end blocks 50i, 50e are placed on the lower tier, the raised ridges 67 align and mate with the groves 66 of the lateral blocks 64, to ensure proper alignment. Subsequent tiers also are formed with grooves and ridges. Other alignment techniques also are known and could be used.

Figure 9:
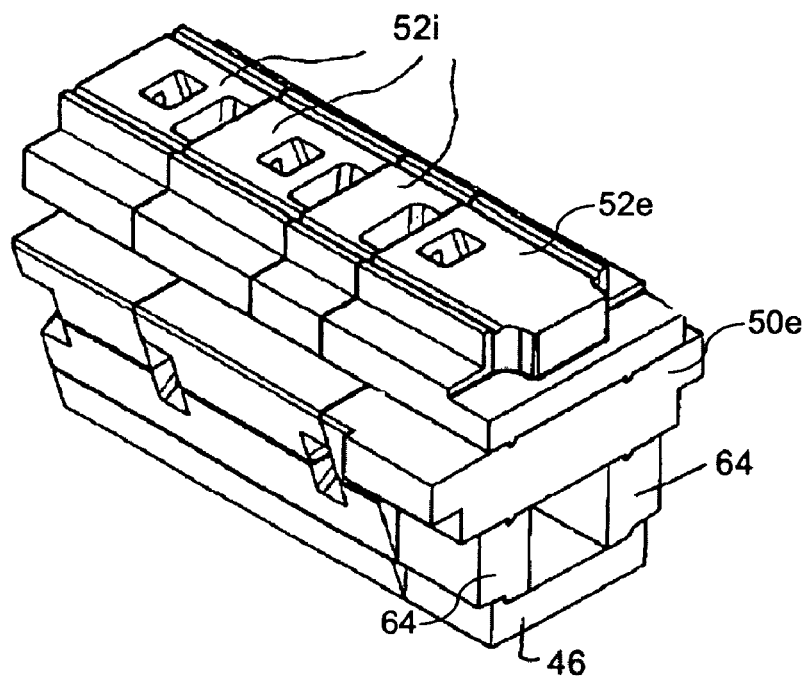
FIG. 9 is a perspective view of tiers 3-9 fully assembled.

FIGS. 8a and 9 show inner modules 52i and an end module 52e of the next tier (tier 8-9) of modules shown in FIG. 8. These modules 52e, 52i include a number of apertures 82. When placed on the lower tier, the apertures 82 substantially align with the vertical apertures 80 and the diagonal apertures 78 of the lower tiers.

FIG. 9 shows the tier 8-9 modules 52 emplaced on the tier 6-7 blocks 50. As noted above, the tier 8-9 blocks are cast with suitable passageways and vertical apertures for the flow of gas and air.

Figure 11:
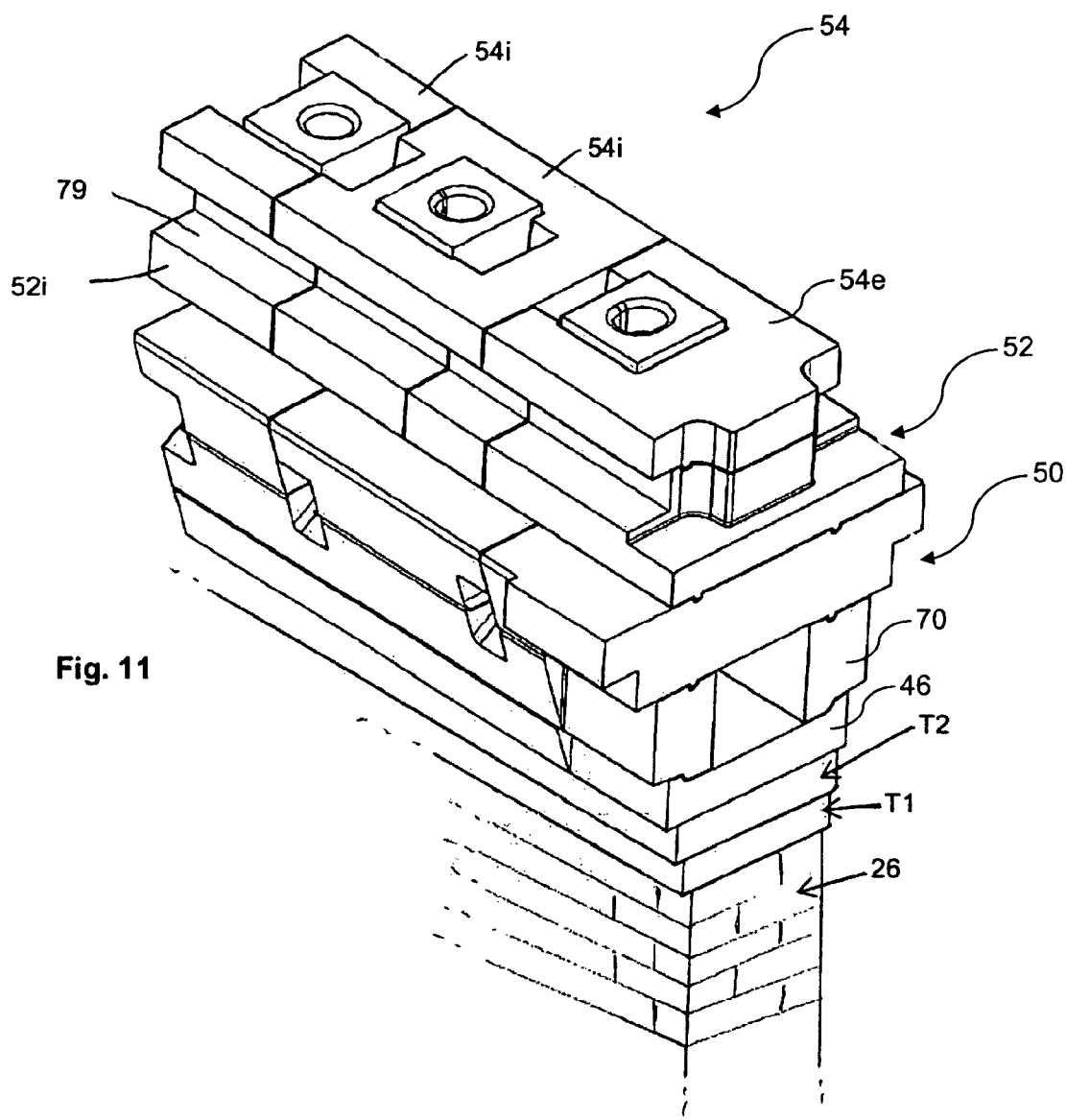
FIG. 11 is a perspective view of replacement tiers 3-10 fully assembled.
Figure 12:
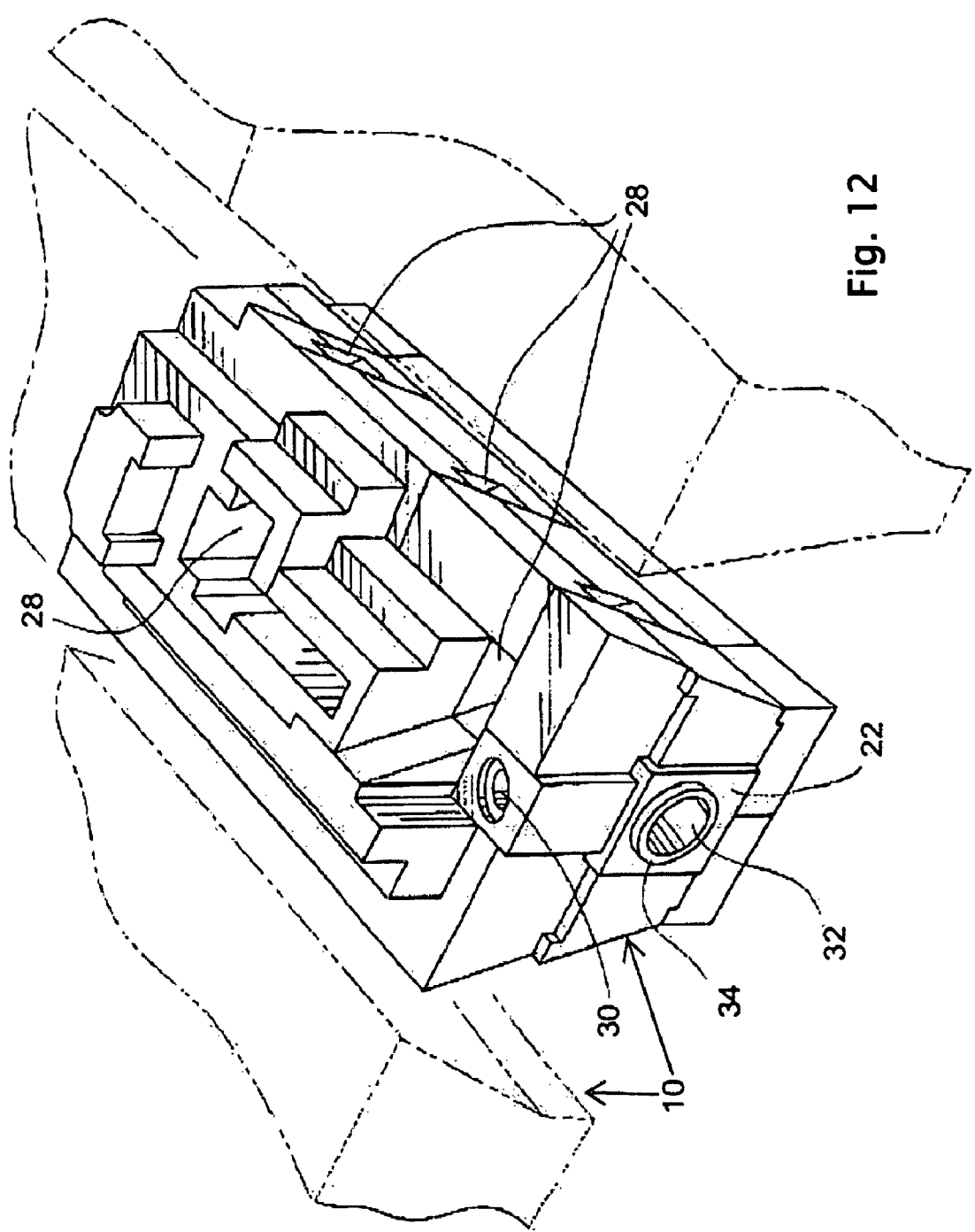
FIG. 12 is a perspective view of a first embodiment of a partially constructed replacement corbel, constructed with large size cast modules, with portions of horizontal and vertical gas lines and flues showing.

The final, or uppermost tier forms the base of the wall and includes top layer blocks 54 and gas blocks 76. FIG. 10 shows the first top layer block emplaced on top of the top row of intermediate blocks. The top layer blocks rest on the blocks in the lower tier, and each includes cavities 84, the cavities being sized to receive the gas blocks 76 therein. FIG. 11 shows a completed section of a corbel constructed according to this invention, with all the blocks in place. Openings are shown for air 28 and a gas gun 56.

While not shown, large size cast monolithic floor modules could also be provided The floor modules preferably would be of a two tier height, the modules being supported on the horizontal lips 79 of the tier, or by a corresponding horizontal lip of an adjacent existing corbel which was not repaired.

Using the assembly method of this invention, plant personnel can perform the repair of the corbel, instead of hiring bricklayers. The modules, which may weigh as much as a metric ton, are positioned using cranes, hoists or the like. In addition, due to the smaller number of blocks, the repairs can be completed in much less time than a traditional repair. This makes this method of repair much less expensive than repairs done with the traditional method. In addition, due to the qualities of the blocks, it is to be expected that the blocks should last longer than traditional silica bricks, thus necessitating fewer repairs and less down-time for repairs. All these factors combined make this a much less expensive and more cost-effective method of repair, both short-term and long-term, than traditional methods.

Additional modifications of the foregoing embodiments also are contemplated. For example, although the invention has been described with reference to replacing a corbel in a gun-type heating system, corbels in other systems also can be replaced in a similar manner, with minor modifications. For example, and as will be appreciated by those of skill in the art, corbels in an under-jet heating system also could be replaced using the present invention. In such an application, the gun blocks 48 would not be included, but the remaining structure would be essentially identical.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the claims are intended to include not only what is illustrated in the drawings of this application and the equivalents discussed in the text, but it is also intended to cover other equivalents now known to those skilled in the art, or those equivalents which may become known to those skilled in the art in the future.

The invention claimed is:

1. A corbel comprising:
   a first tier having first blocks, each of the first blocks comprising a first, substantially horizontal aperture extending through the first block from a front surface to a back surface and a second, substantially vertical aperture formed through a top surface of the block, extending into the first aperture, the first blocks being arranged on a substantially planar surface to align the respective first apertures to define a first, substantially horizontal passageway;
   a second tier having second blocks, each of the second blocks comprising a third, substantially vertical aperture extending through the second block from a top surface to a bottom surface, the second blocks being disposed above the first tier of blocks to align the third aperture of each of the second blocks with the second aperture of the first blocks to form a second passageway;
   a third passageway extending diagonally from the top of the one of the second blocks to a side of at least one of the first and second blocks; and
   a gas source for providing gas to the first passageway.

2. The corbel of claim 1, further comprising a third tier having third blocks, each of the third blocks comprising at least one fourth aperture formed through the third block from a top surface to a bottom surface, the third blocks disposed above the second blocks such that each fourth aperture substantially aligns with the second passageway.

3. The corbel of claim 1, wherein the first tier further comprises lateral blocks arranged proximate sides of the first blocks.

4. The corbel of claim 3, wherein the lateral blocks include an angled notch extending along a portion of each of a top surface and a side surface of the lateral blocks, the notch aligning with an opening in the second blocks to form an air passageway.

5. The corbel of claim 1, wherein each of the first blocks has a lip on at least one of the front surface and the back surface, circumscribing at least a portion of the first aperture.

6. The corbel of claim 5, wherein the lip is formed on one of the front surface and the rear surface of the first block and a recess is formed on the other of the front surface and the rear surface, circumscribing at least a portion of the first passageway.

7. The corbel of claim 1, further comprising at least one foundation block, the first tier and second tier being positioned above the foundation block.

8. The corbel of claim 7, further comprising lateral blocks arranged proximate sides of the first blocks in the first tier, each of the lateral blocks having a lengthwise indentation,
   wherein the at least one foundation block has raised lateral edges, and wherein the first blocks are disposed on the foundation block between the lateral edges and each of the lateral blocks is disposed proximate a side of the first blocks such that the lengthwise indentation mates with the raised lateral edges of the foundation block.

9. The corbel of claim 1, further comprising a top tier disposed above the second tier, the top tier comprising at least one first top tier block and at least one second top tier block, the at least one first top tier block defining at least one cavity for receiving the at least one second top tier block.

10. A method of constructing the corbel of claim 1, comprising the steps of:
- laying the first tier of blocks;
- laying the second tier of blocks above the first tier of blocks; and
- introducing gas to the first aperture using the gas source, the gas passing from the first passageway into the second passageway.

11. The method of claim 10, further comprising the step of applying mortar between the first tier of blocks and the second tier of blocks.

12. The method of claim 10, further comprising the step of applying mortar between at least one of the first blocks comprising the first tier of blocks and the second blocks comprising the second tier of blocks.

13. The method of claim 10, further comprising the step of removing a to-be-replaced-corbel prior to laying the first tier of blocks and laying the second tier of blocks, the to-be-replaced-corbel comprising a number of bricks that is at least four times a number of blocks used to reconstruct the corbel.

14. The method of claim 13, further comprising leveling a surface upon which the corbel will be constructed prior to laying the first tier of blocks arid laying the second tier of blocks.

15. The method of claim 10, further comprising laying one or more foundation blocks prior to laying the first tier of blocks and the second tier of blocks, the foundation blocks having raised lateral edges.

16. The method of claim 15, wherein the first tier is laid on the foundation block such that the first blocks are placed between the raised edges, the first tier of blocks further comprising a plurality of lateral blocks arranged along sides of the first blocks, the lateral blocks having indentations that mate with the raised edges of the foundation blocks.

17. The method of claim 10, further comprising laying a third tier of blocks comprising third blocks above the second tier of blocks, each of the third blocks having at least one fourth aperture formed therethrough, from a top surface to a bottom surface, the third blocks being arranged above the second tier of blocks such that each fourth aperture substantially aligns with third aperture.

18. The method of claim 10, further comprising laying an uppermost tier of blocks above the second tier of blocks, the uppermost tier of blocks comprising a number of top layer blocks, the top layer blocks defining at least one cavity about the third aperture.

19. The method of claim 18, further comprising laying a gas block in each of the at least one cavities.

* * * * *